Figure 1:
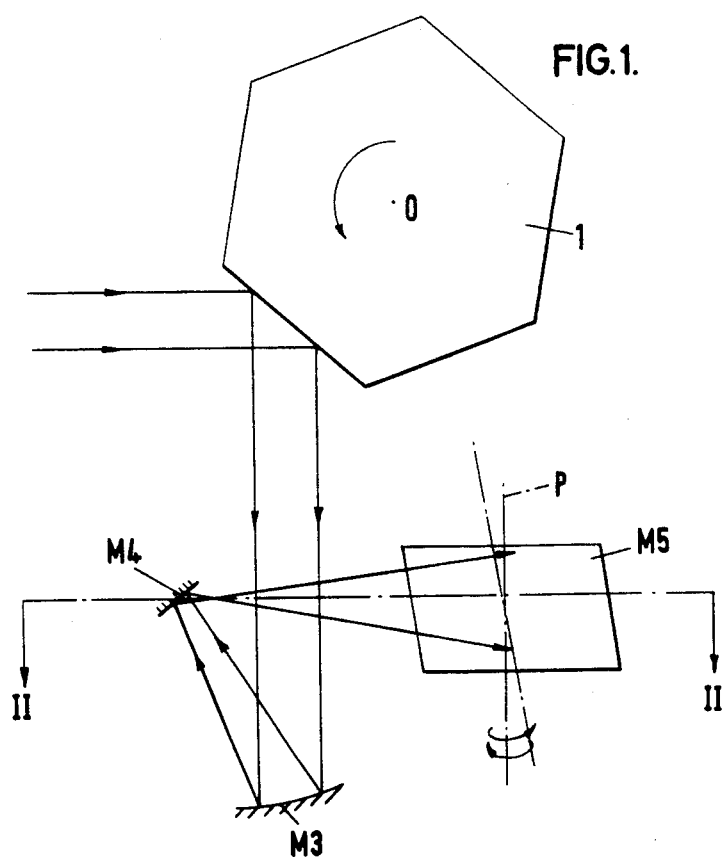

United States Patent [19]

Moore

[11] 4,202,597
[45] May 13, 1980

[54] OPTICAL SCANNING SYSTEM WITH COMPENSATION FOR UNWANTED IMAGE ROTATION DURING SCANNING

[75] Inventor: William T. Moore, London, England

[73] Assignee: The Rank Organisation Limited, London, England

[21] Appl. No.: 865,781

[22] Filed: Dec. 30, 1977

[30] Foreign Application Priority Data

Jan. 7, 1977 [GB] United Kingdom ............... 537/77

[51] Int. Cl.² ............................................. G02B 27/17
[52] U.S. Cl. ..................................... 350/6.6; 350/6.8
[58] Field of Search .................... 350/6.5–6.91, 350/285; 250/236, 235; 358/206, 208

[56] References Cited

U.S. PATENT DOCUMENTS

| | | | |
|---|---|---|---|
| 3,554,628 | 1/1971 | Kennedy | 350/199 |
| 3,758,715 | 9/1973 | Buck et al. | 350/6.91 |
| 3,782,803 | 1/1974 | Buck | 350/6.8 |
| 3,790,246 | 2/1974 | Pickering | 350/6.8 |
| 3,813,140 | 5/1974 | Knockeart | 350/6.8 |
| 4,008,371 | 2/1977 | Barron | 350/285 |
| 4,097,115 | 6/1978 | Garwin et al. | 350/6.7 |

*Primary Examiner*—Jon W. Henry
*Attorney, Agent, or Firm*—Brisebois & Kruger

[57] ABSTRACT

In optical scanning systems loss in spatial resolution can result in coupling systems incorporating off axis concave mirrors by virtue of image rotation. In such systems compensation can be introduced for this image rotation by inclining the axis of oscillation of the scanning mirror at a small angle to the plane of that mirror.

5 Claims, 4 Drawing Figures

OPTICAL SCANNING SYSTEM WITH COMPENSATION FOR UNWANTED IMAGE ROTATION DURING SCANNING

This invention relates to optical scanning systems with particular, but not exclusive, reference to infrared scanning.

It is known to effect optical scanning in two dimensions, using optical coupling between a line or azimuth scanning element such as a rotating polygonal prism and a frame or elevation scanning element such as an oscillating plane mirror.

In the optical scanner described in our patent application Ser. No. 714,492, which issued as U.S. Pat. No. 4,106,845 coupling is provided between azimuth and elevation scanning elements by means of a Schmidt type optical coupling system including a concave mirror. This mirror has to be arranged with its optical axis inclined to the axis of the incident radiation beam, and consequently the image of the two dimensional detector array being scanned rotates during the scan. This results in a displacement in elevation of successive azimuth scan lines, and if such a system is used for scanning a two dimensional array of light emitting diodes or other sources a banding effect can occur in the resulting display.

Similarly, when such an optical scanning system is used with radiation receiving optical or electro-optical elements a loss in spatial resolution can result from the image rotation introduced by the off-axis concave mirror of the optical coupling system.

The present invention provides a convenient method of compensating for the aforesaid image rotation during scanning in an optical scanning system, and according to the present invention there is provided an optical scanning system in which optical coupling between azimuth and elevation scanning elements is provided by means of a concave mirror arranged to receive a radiation beam from an azimuth scanning element, the mirror being inclined to the axis of the beam to direct radiation onto an oscillating plane mirror constituting an elevation scanning element and positioned at substantially the same optical path length from the concave mirror as the azimuth scanning element, and wherein the elevation scanning mirror is mounted for oscillation about an axis which is inclined at a small angle to the plane of the mirror such as substantially to compensate the image rotation during scanning introduced by the off-axis inclination of the concave mirror.

The mounting of the elevation scanning mirror for rotation about an axis which is slightly inclined to the plane of the mirror causes the mirror to scan a curved image and to rotate the image by an amount corresponding to the image curvature. It is therefore possible by appropriate choice of the angle between the plane of the mirror and its axis of rotation to cancel out the rotation introduced during scanning by the off-axis concave mirror of the coupling system by the rotation introduced by the elevation scanning mirror.

By using a double faced elevation scanning mirror the system can be used for optical scanners incorporating an illuminated two dimensional display such as an array of light emitting diodes.

Thus in one embodiment of the invention the elevation scanning mirror may have two faces one of which scans radiation receiving optics for spatial resolution of received radiation and the other of which scans an array of light emitting diodes or other light sources. The elevation scanning mirror may comprise a narrow angled rooftop mirror formed, for example, by an acute-angle prism with reflecting faces adjoining its apex.

A prism element may be disposed in the optical path between the concave mirror and the light emitting diodes or sources when these are present to correct for the rotation introduced by the off-axis inclination of the concave mirror.

Figure 2:
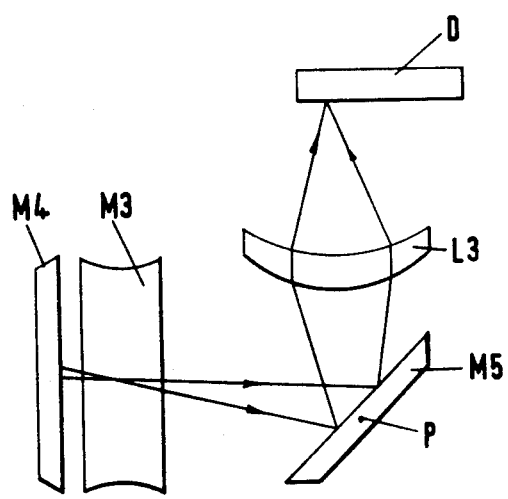
Figure 3:
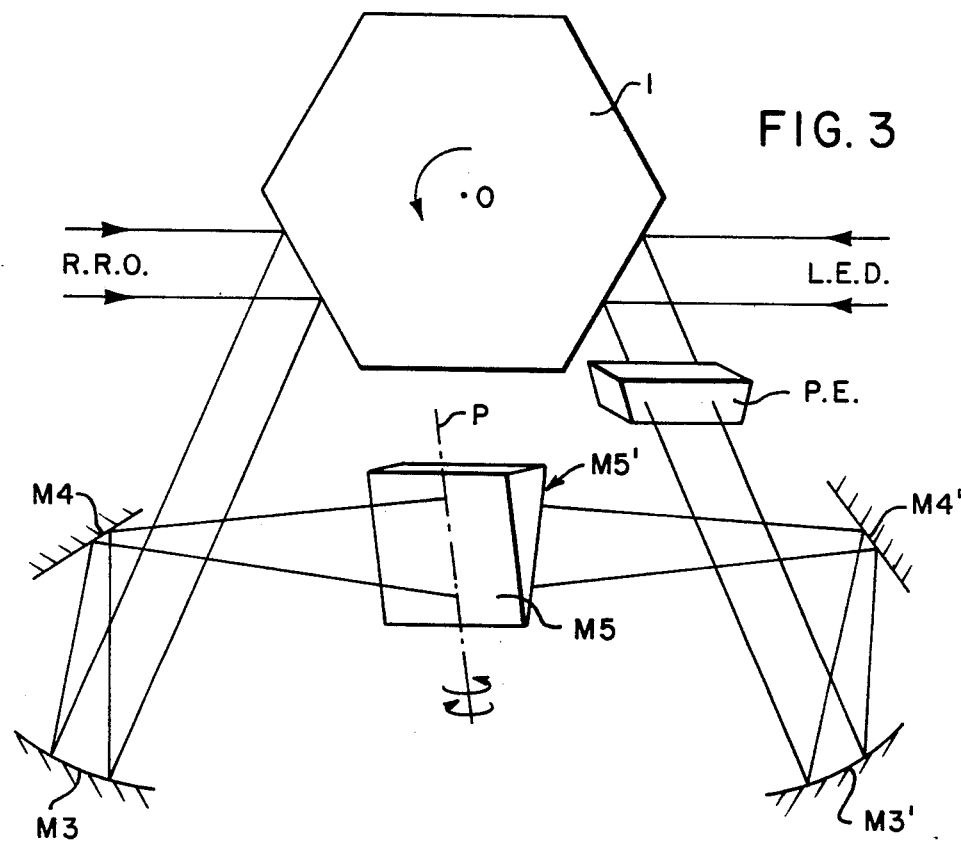
Figure 4:
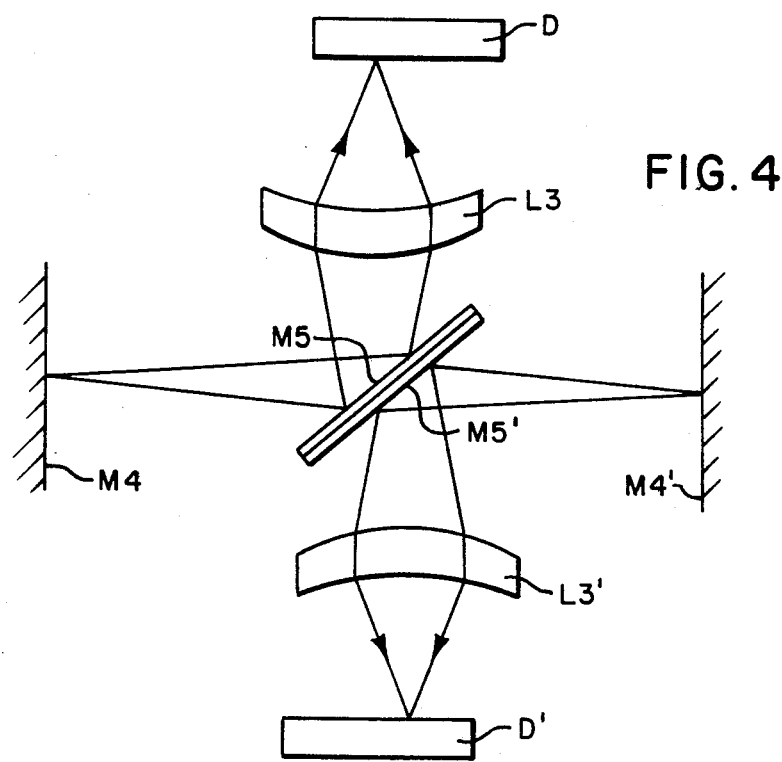

One embodiment of the invention will be described, by way of example only, with reference to the accompanying purely diagrammatic drawings, in which:

FIG. 1 is a plan view of a relay optical system associated with an optical scanning apparatus according to one embodiment of the invention, FIG. 2 is a diagrammatic sectional view taken on the line II—II of FIG. 1, and FIGS. 3 and 4 show in analogous manner to FIGS. 1 and 2 the application of the relay optical system to a scanner which simultaneously scans radiation receiving optics and an array of light sources.

Referring to FIG. 1 a rotating polygon 1, in this example a hexagon, is mounted for rotation about its longitudinal axis O for effecting line or azimuth scanning of a scene to be scanned by a two dimensional detector array D, shown diagrammatically in FIG. 2. Radiation from the scene being scanned is directed onto successive faces of the rotating polygon 1 by an afocal telescope system (not shown) which effectively demagnifies the scan of the polygon, matching a system pupil which is located effectively at each successive polygon face.

After reflection at each successive face of the rotating polygon 1 the incident beam of radiation is directed by a relay optical coupling system, shown diagrammatically in FIGS. 1 and 2, on to an elevation or frame scanning element. In the illustrated embodiment the relay optical coupling system comprises a concave imaging mirror M3 which is located at a distance from the reflecting face of the rotating polygon 1 approximately equal to its radius of curvature, the axis of the concave mirror M3 being displaced by a slight angle relative to the axis of the incident beam of radiation. As shown in FIG. 1 this off-axis inclination of the concave mirror M3 amounts to a few degrees, and its purpose is to direct the radiation reflected by the mirror M3 into a beam deflecting flat mirror M4 located outside the beam of radiation reflected by the polygon 1 close to the focal plane of the concave mirror M3, the flat mirror M4 being elongated in a direction parallel to the axis of rotation O of the polygon 1, as shown in FIG. 2. The mirror M4 reflects radiation on to an elevation scanning mirror M5 which oscillates about an axis P which is perpendicular to the axis of rotation O of the polygon 1. The radiation reflected by the oscillating mirror M5 is gathered by a lens L3 and imaged onto a detector array D.

The rate of oscillation of the elevation scanning mirror M5 is related to the rotational speed of the azimuth scanning element, that is, the polygon 1, so that the combined effect of the rotating polygon 1 and the oscillating mirror M5 is to cause the detector to scan successive areas of a scene in a succession of azimuth or line scans which are scanned progressively in elevation to form a number of successive frames. The rate of frame scanning will be determined by the rate of oscillation of the mirror M5 and the rate of line scanning by the speed of rotation of the polygon 1.

The optical path length between the concave mirror M3 and the oscillating mirror M5 is substantially equal to the optical path length between the mirror M3 and the reflecting face of the polygon 1. In this way extra-axial optical aberrations are eliminated, since the effective pupil will be at the centre of curvature of the mirror M3, which therefore produces no coma or astigmatism, apart from that due to the slight off-axis inclination.

Since the concave mirror M3, which forms part of a Schmidt type optical system, has a slight off-axis inclination, the image of the detector array produced in the otpical system rotates during the scan. This can lead to a loss of spatial resolution when the detector array D comprises radiation receiving optical or photoelectric elements.

To compensate for the above mentioned rotation of the image caused during scanning by the off-axis inclination of the mirror M3 it is arranged that the axis of rotation P of the elevation scanning mirror M5 is inclined at a slight angle of a few degrees to the plane of the mirror M5. This causes the mirror M5 to scan a curved image, and to rotate the image during scanning by an amount corresponding to this curvature. The angle of inclination of the axis of rotation P to the plane of the mirror M5 is so chosen that the resulting rotation of the image produced by the mirror M5 exactly cancels the rotation during scanning due to the off-axis concave mirror M3.

By using a double faced elevation scanning mirror (FIGS. 3 and 4), the system can be used for optical scanners incorporating an illuminated two dimensional display such as an array of light emitting diodes.

Thus in one embodiment of the invention the elevation scanning mirror may have two faces M5 and M5′, one of which scans radiation receiving optics for spatial resolution of received radiation along path R.R.O. and the other of which scans an array of light emitting diodes or other light sources emitting light along path L.E.D. The elevation scanning mirror may comprise a narrow angled rooftop mirror formed, for example, by an acute-angle prism with reflecting faces M5 and M5′ adjoining its apex as shown at FIG. 3. This system simply duplicates the optical components which follow the rotating polygon 1 of FIG. 1, and thus includes components M3′, M4′, M5′, L3′, and D′ which correspond respectively to M3, M4, M5, L3 and D of FIG. 1.

Since the axis of oscillation P of the optical wedge M5, M5′ cannot be tilted to compensate for the image rotation during scan produced by the inclination of the mirror M3′ (since the tilt of this wedge is already selected to compensate for image rotation due to the inclination of the mirror M3), prism element (P.E.) is introduced to compensate for image rotation during scan produced by the inclination of the mirror M3′.

What I claim is:

1. An optical scanning system comprising an azimuth scanning element having a plurality of plane reflecting faces driven in rotation successively to receive a beam of radiation representing a scene being scanned, optical coupling means including a concave mirror receiving the beam from the azimuth scanning element, and an elevation scanning element comprising an oscillating plane mirror receiving the beam from the optical coupling means, said oscillating plane mirror being positioned at substantially the same optical path length from the concave mirror as the azimuth scanning element, wherein the axis of the concave mirror is slightly inclined to the axis of the beam incident thereon, whereby the image produced by said concave mirror is rotated during scanning in a manner such that said image is seen by the oscillating plane mirror as a curved image, and wherein the axis of oscillation of the oscillating plane mirror is inclined at a small angle to the plane of said plane mirror to scan said curved image, said small angle being selected to produce an image rotation during scanning which is substantially equal and opposite to the image rotation produced during scanning by the slightly inclined axis concave mirror.

2. An optical scanning system according to claim 1, in which the elevation scanning element has two mirror faces which respectively scan differing beams of radiation, respectively received simultaneously from different reflecting faces of the azimuth scanning element via first and second concave mirrors.

3. An optical scanning system according to claim 2, including a prism element through which the second beam of radiation is transmitted to correct for image rotation produced during scanning by the slightly inclined axis of the second concave mirror, the axis of oscillation of the elevation scanning element being selected to correct for image rotation produced during scanning by the slightly inclined axis of the first concave mirror.

4. An optical scanning system according to claim 2, in which the elevation scanning element comprises a narrow angled roof-top mirror.

5. An optical scanning system according to claim 4, in which the roof-top mirror comprises an acute-angled prism with reflecting faces adjoining its apex.

* * * * *